3,248,383
BENZENESULFONYL-SEMICARBAZIDES AND
PROCESS FOR THEIR MANUFACTURE
Karl Muth, Kelkheim, Taunus, Gerhard Korger, Frankfurt am Main, and Walter Aumüller, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Dec. 20, 1962, Ser. No. 245,988
Claims priority, application Germany, Dec. 27, 1961, F 35,666
1 Claim. (Cl. 260—239)

It has already been proposed to prepare 4-benzenesulfonyl-1, 1-alkylene-semicarbazides which are distinguished by a strong antidiabetic activity by reacting benzenesulfonamides with alkylene-imino-isocyanates. Instead of these isocyanates there may also be used derivatives of said isocyanates such, for example, as alkylene-imino-carbamic acid chlorides, alkylene-imino-carbamic acid esters and 1,1-alkylene-semicarbazides. These processes do not meet industrial requirements. The isocyanates themselves are extremely unstable. They also tend to dimerization and are, therefore,, unsuitable as starting material for reaction with benzenesulfonamides on an industrial scale (cf. Organic Reactions, vol. III, page 337) even when assuming their formation as intermediates in the course of various further reactions (cf. the formation of hydrazine as by-product in the course of the decomposition of urea according to Hoffmann). The corresponding acid chlorides of the carbamic acid series, which are obtained either as primary products in the preparation of isocyanates or by adding hydrogen chloride to the corresponding isocyanates, are in this connection also of no industrial importance.

It is possible to obtain 4-benzenesulfonyl-1,1-alkylene-semicarbazides from 1,1-alkylene-semicarbazides or alkylene-imino-carbamic acid esters—the preparation of which is known from the relevant literature—by the reaction with benzenesulfonamides advantageously in the form of their alkali metal salts. In this case, however, the yields are so small that the process of preparing the afore-mentioned semicarbazides cannot be considered as an industrial process.

Also a somewhat modified process comprising the reaction of the sodium salts of benzenesulfonamide with 1,1-alkylene-semicarbazides acylated in 4-position offers no advantages; on the contrary, the reaction proceeds less satisfactorily than with the use of non-acylated compounds.

Now, we have found that pure benzenesulfonyl-semi-carbazides of the general formula

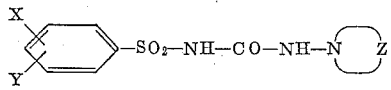

wherein X and Y may be equal or different and represent hydrogen atoms, halogen atoms, alkyl and alkoxy groups containing at most 6 carbon atoms and, if X represents hydrogen, Y can also stand for the trifluoromethyl, azido, acetyl or benzoyl group, and Z represents an alkylene group containing from 3 to 7 carbon atoms which may—if desired—be substituted by further low molecular weight alkyl radicals, can be obtained in a smooth reaction with very good yields and in an industrially simple manner by reacting benzenesulfonamides of the general formula

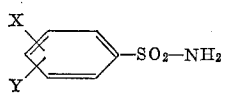

wherein X and Y have the meanings given above, with 1,1,5,5-alkylene-carbohydrazides of the general formula

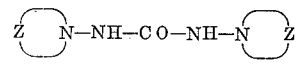

wherein Z has the meaning given above, at temperatures above 100° C.

The success of the process according to the invention is surprising since with the 1,1-alkylene-semicarbazides which are unsubstituted on one side or even acylated in 4-position, the benzenesulfonamides are not in a position to split the 2,3-linkage (hydrazide linkage) as a deviation reaction for the difficult separation of the 3,4-linkage (amide linkage).

The process of the invention is particularly distinguished by a very rapid and clear course of the reaction and by excellent yields. It is a further advantage of the process of the present invention that the starting materials used can be easily obtained and that they work in a simple manner.

As benzenesulfonamides there can be used, for example, the following compounds, preferably in the form of their salts:

4-chloro-benzenesulfonamide,
4-bromo-benzene-sulfonamide or
4-fluoro-benzenesulfonamide,
2-methyl-benzenesulfonamide,
3-methyl-benzenesulfonamide,
4-methyl-benzenesulfonamide,
3-ethyl-benzenesulfonamide,
4-ethyl-benzenesulfonamide,
4-isopropyl-benzenesulfonamide,
3-methoxy-benzenesulfonamide,
4-methoxy-benzenesulfonamide,
4-ethoxy-benzenesulfonamide,
3-trifluoromethyl-benzenesulfonamide,
4-tert. butyl-benzenesulfonamide,
4-isoamyl-benzenesulfonamide,
4-tert. amyl-benzenesulfonamide,
4-pentyl(3′)-benzenesulfonamide,
4-n-hexyl-benzenesulfonamide,
4-azido-benzenesulfonamide,
4-acetyl-benzenesulfonamide; furthermore
3,4-dimethyl-benzenesulfonamide,
3,4-dimethoxy-benzenesulfonamide,
3,4-dichloro-benzenesulfonamide,
3-chloro-4-methyl-benzenesulfonamide,
2-chloro-5-methyl-benzenesulfonamide,
3-chloro-4-methoxy-benzenesulfonamide,
3-methyl-4-methoxy-benzenesulfonamide and
3-fluoro-4-methyl-benzenesulfonamide.

These compounds can be easily obtained according to processes known from the relevant literature.

The 1,1,5,5-alkylene-carbohydrazides used for the reaction with the afore-mentioned benzenesulfonamides can be prepared in a simple manner and with good yields via the corresponding alkylene-imino-carbamic acid esters—which are obtained by the reaction of 1,1-alkylene-hydrazines with a chloroformic acid ester—by reacting them when molten at about 150° C. with a further mol of 1,1-alkylene-hydrazine. The 1,1,5,5-alkylene-carbohydrazides are soluble in hydrocarbons and can be obtained in a very pure form by recrystallization from said solvent. As starting substances can be used, for example, 1,1,5,5-tri-methylene-carbohydrazide, 1,1,5,5-tetramethylene- carbohydrazide, 1,1,5,5 - pentamethylene - carbohydrazide, 1,1,5,5, - hexamethylene - carbohydrazide, 1,1,5,5 - heptamethylene-carbohydrazide and the corresponding compounds which are substituted by low molecular weight alkyl radicals.

The process according to the present invention is advantageously carried out by heating a correspondingly substituted sulfonamide, preferably in the form of the alkali metal salt, advantageously the sodium salt, and a 1,1,5,5,-alkylenecarbohydrazide advantageously in molecular quantities in an open flask. The reaction is preferably carried out at a temperature above 100° C., particularly in the range from 150 to 200° C. In most cases the melt so obtained solidifies after 5 minutes while the alkali metal salt of the desired product is formed. Said salt can be converted into the corresponding free compound by dissolving it in water and by acidifying it. The products of the present invention are obtained with a yield of 80 to 90% of the theory.

The benzenesulfonyl-semicarbazides obtained according to the process of the present invention are valuable medicaments which are distinguished by a good hypoglycemic action and a low toxicity.

For example, 4-(2'-methyl-benzenesulfonyl)-1,1-pentamethylene-semicarbazide prepared in accordance with the present invention and administered orally in a dose of 400 mg./kg. to a rabbit caused a strong lowering of the blood sugar level as can be seen from the following table.

| Time in hours | 1 | 2 | 3 | 4 | 5 | 6 |
|---|---|---|---|---|---|---|
| Lowering of the blood sugar in percent | −14 | −20 | −23 | −28 | −31 | −36 |

Furthermore, a lowering of the blood sugar level by 30% could already be detected 6 hours after administration of 4-(4'-methyl-benzenesulfonyl)-1,1-tetramethylene-semicarbazide in a dose of 100 mg./kg. to a rabbit. The value of the blood sugar level was determined in usual manner according to the method of Hagedorn/Jensen. The strong activity of the compounds of the present invention becomes more apparent when testing the compounds within the range of "threshold"-doses. By "threshold"-dose is menant that amount of active substance in mg./kg. of body weight of the animal tested which must be administered intravenously or orally to produce a distinct lowering of the blood sugar level as compared to control animals kept under equal conditions. These tests showed that the "threshold"-dose of the benzenesulfonyl-semicarbazides of the present invention is in a very low range. Thus, 1.25–2.5 mg./kg. of 4-(4'-methyl-benzenesulfonyl - 1,1 - tetramethylene - semicarbazide administered intravenously to rabbits and 5 mg./kg. of this compound administered orally to rabbits, sufficed to produce a lowering of the blood sugar level. The comparative values in the threshold range for the known N-(4-methyl-benzenesulfonyl)-N'-n-butyl-urea, determined under equal conditions, were 35 mg./kg. of rabbit on oral administration and 20 mg./kg. upon intravenous administration. Hence, the 4-(4'-methyl-benzenesulfonyl)-1,1-tetramethylene-semicarbazide is orally 7 times and intravenously 8 to 16 times as effective as the known compound.

The products of the present invention are intended to be used preferably for the manufacture of preparations suitable for oral administration and lowering the blood sugar level in the treatment of diabetes mellitus. The sulfonyl-semicarbazides may then be used as such or in the form of their physiologically tolerable salts with bases or acids or in the presence of substances which cause salt formation. For the formation of salts, there may be used, for example, alkaline agents, such for example, as alkali metal hydroxides or alkaline earth metal hydroxides, alkali metal carbonates and alkaline earth metal carbonates, alkali metal bicarbonates and alkaline earth metal bicarbonates, as well as physiologically tolerated organic bases; furthermore, acids such, for example, as hydrochloric acid, hydrobromic acid, sulfuric acid and amidosulfonic acid.

As pharmaceutical preparations there enter into consideration preferably tablets containing from 0.05 to 0.5 gram per dosage unit of the products of the invention, and in addition thereto, the usual adjuvants and carriers such as talc, starch, lactose, tragacanth or magnesium stearate.

The following examples serve to illustrate the invention, but they are not intended to limit it thereto:

*Example 1.—4-(4'-methyl-benzenesulfonyl)-1,1-hexamethylene-semicarbazide*

0.890 gram (4.9 millimols) of sodium 4-toluene-sulfonamide were thoroughly mixed with 1.21 grams (4.76 millimols) of 1,1,5,5-hexamethylene-carbohydrazide and were introduced into a bath heated at 180° C. while stirring. After 10 minutes the reaction mixture was cooled, dissolved in water, filtered, and the filtrate was acidified with acetic acid. The precipitate formed was filtered off with suction and recrystallized from ethanol. The pure white 4-(4'-methyl-benzenesulfonyl)-1,1-hexamethylene-semicarbazide was obtained in a very good yield and melted at 167° C.

From 1.05 grams of sodium 3,4-dimethyl-benzenesulfonamide and 1.25 grams of 1,1,5,5-hexamethylene-carbohydrazide there was obtained in an analogous manner in the course of 5 minutes at 180° C., 4-(3',4'-dimethyl-benzenesulfonyl)-1,1-hexamethylene-semicarbazide melting at 145–147° C. The yield was 1.25 grams (81% of theory).

From 2.75 grams of sodium 4-chloro-benzenesulfonamide and 3.3 grams of 1,1,5,5-hexamethylene-carbohydrazide there was also obtained in an analogous manner in the course of 15 minutes at 150° C. and with a good yield 4-(4'-chloro-benzenesulfonyl)-1,1-hexamethylene - semicarbazide melting at 192° C.

*Example 2.—4-benzenesulfonyl-1,1-pentamethylene-semicarbazide*

1.8 grams of sodium benzenesulfonamide were thoroughly ground in a mortar with 2.3 grams of 1,1,5,5-pentamethylene-carbohydrazide and heated for 15 minutes at 180° C. while stiring. After cooling, the reaction mixture was dissolved in 30 cc. of water, filtered, and the filtrate was acidified with acetic acid. The precipitate formed was filtered off with suction and recrystallized from methanol. There was obtained 4-benzene-sulfonyl-1,1-pentamethylene-semicarbazide in a yield of 78% of theory, melting at 175° C.

From 2.0 grams of sodium-2-methyl-benzenesulfonamide and 2.3 grams of 1,1,5,5-pentamethylene-carbohydrazide there was obtained in an analogous manner at 150–160° C. and during a heating period of 15 minutes 4-(2'-methyl - benzenesulfonyl) - 1,1 - pentamethylene-semicarbazide in a yield of 90%. Melting point 172° C.

From 0.430 gram of sodium 4-toluenesulfonamide and 0.5 gram of 1,1,5,5-pentamethylene-carbohydrazide there was obtained in an analogous manner on stirring and working up the mixture for 10 minutes at 160° C., 4-(4'-methyl - benzenesulfonyl) - 1,1, - pentamethylene - semicarbazide in a yield of 85%. Melting point 205° C. after recrystallization from ethanol.

From 1.0 gram of sodium 4-chlorobenzenesulfonamide and 1.1 grams of 1,1,5,5-pentamethylene-carbohydrazide there was obtained an analogous manner in the course of 15 minutes at 160° C. 4-(4'-chloro-benzenesulfonyl)-1,1-pentamethylene-semicarbazide, melting at 213° C. (after recrystallization from ethanol/dimethylformamide).

From 2.1 grams of sodium 3,4-dimethyl-benzenesulfonamide and 2.3 grams of 1,1,5,5-pentamethylene-carbohydrazide there were obtained in an analogous manner in the course of 5 minutes at 180° C. 2.6 grams (81% of theory) of 4-(3',4'-dimethyl-benzenesulfonyl)-1,1-pentamethylene-semicarbazide. The compound was found to melt at 165–167° C. (after recrystallization from methanol/water).

4-(4'-methoxy - benzenesulfonyl)-1,1 - pentamethylene-semicarbazide was formed in the same good yield from 2.0 grams of sodium 4-methoxy-benzenesulfonamide and 2.3 grams of 1,1,5,5-pentamethylene-carbohydrazide in the course of 10 minutes at 180° C. After recrystallization from methanol the 4-(4'-methoxy-benzenesulfonyl)-1,1-pentamethylene-semicarbazide formed melted at 170–172° C.

By reacting the corresponding starting components there were obtained 4-(4-azido-benzenesulfonyl)-1,1 - hexamethylene-semicarbazide melting at 163–164° C. (from acetic ester) and 4-(4-azido-benzenesulfonyl)-1,1-(γ-methyl-pentamethylene)-semicarbazide melting at 187–189° C. (with decomposition after recrystallization from acetone).

By reacting the corresponding starting components there were obtained in an analogous manner:

4-(4-isopropyl-benzenesulfonyl)-1,1-tetramethylene-semicarbazide, melting at 174–175° C. (from ethanol/water).
4-(4-tert.butyl-benzenesulfonyl)-1,1-tetramethylene-semicarbazide, melting at 186–187° C. (from isopropanol).
4-(2-methyl-benzenesulfonyl)-1,1-pentamethylene-semicarbazide, melting at 178° C. (from methanol).
4-benzenesulfonyl-1,1-(2'-methyl-pentamethylene)-semicarbazide, melting at 191–193° C. (from methanol).
4-benzenesulfonyl-1,1-hexamethylene-semicarbazide, melting at 159–161° C. (from methanol).
4-(3'-fluoro-4'-methyl-benzenesulfonyl)-1,1-pentamethylene-semicarbazide, melting at 150–151° C. (from methanol).
4-(3'-chloro-4'-methoxy-benzenesulfonyl)-1,1-tetramethylene-semicarbazide, melting at 144–145° C. (from aqueous methanol).
4-(3'-chloro-4'-methoxy-benzenesulfonyl)-1,1-pentamethylene-semicarbazide, melting at 146–147° C. (from aqueous methanol).
N-(3',4'-dichloro-benzenesulfonyl)-N'-1,1-hexamethylene-semicarbazide, melting at 166° C. (from ethanol).
4-(2'-methoxy-5'-chloro-benzenesulfonyl)-1,1-hexamethylene-semicarbazide, melting at 173–175° C. (from dimethylformamide/methanol).
4-(3'-methyl-4'-methoxy-benzenesulfonyl)-1,1-tetramethylene-semicarbazide, melting at 153–155° C. (from ethanol/water).
4-(3'-methyl-4'-methoxy-benzenesulfonyl)-1,1-pentamethylene-semicarbazide, melting at 158–160° C. (from ethanol/water).
4-(3',4'-dimethoxy-benzenesulfonyl)-1,1-pentamethylene-semicarbazide, melting at 154–156° C. (from ethanol/water).
4-(4-n-propyl-benzenesulfonyl)-1,1-pentamethylene-semicarbazide, melting at 144-146° C. (from ethanol/water).
4-(4-ethyl-benzenesulfonyl)-1,1-pentamethylene-semicarbazide, melting at 174–176° C. (from methanol).
4-(2-chloro-benzenesulfonyl)-1,1-hexamethylene-semicarbazide, melting at 164–166° C. (from ethanol).
4-(3-chloro-benzenesulfonyl)-1,1-hexamethylene-semicarbazide, melting at 155° C. (from ethanol).
4-(2-bromo-benzenesulfonyl)-1,1-hexamethylene-semicarbazide, melting at 174–176° C. with decomposition (from ethanol).
4-(3-bromo-benzenesulfonyl)-1,1-hexamethylene-semicarbazide, melting at 159–161° C. (from ethanol).
4-(3-methyl-benzenesulfonyl)-1,1-hexamethylene-semicarbazide, melting at 141–142° C. (from methanol).
4-(4-ethoxy-benzenesulfonyl)-1,1-hexamethylene-semicarbazide, melting at 170–172° C. (from methanol).
4-(4-methoxy)-benzenesulfonyl)-1,1-(α,α-dimethyl-trimethylene)-semicarbazide, melting at 168–170° C. (from water/ethanol).
4-(3-trifluoromethyl-benzenesulfonyl)-1,1-hexamethylene-semicarbazide, melting at 159–161° C. (from water/ethanol).
4-(4-methyl-benzenesulfonyl)-1,1-heptamethylene-semicarbazide, melting at 138–139° C. (from methanol/water).

*Example 3.—4-4'-methyl-benzenesulfonyl)-1,1-tetramethylene-semicarbazide*

4-(4'-methyl - benzenesulfonyl)-1,1 - tetramethylene-semicarbazide was obtained by reacting 2.0 grams of sodium 4-toluene-sulfonamide with 2.0 grams of 1,1,5,5-tetramethylene-carbohydrazide. The components were ground in a mortar and the mixture was heated in an Erlenmeyer flask, while stirring, for 5 minutes at 180° C. The cool sodium salt was dissolved in water, filtered, and the filtrate was acidified with acetic acid. The separated precipitate was recrystallized from methanol. The yield of 4-(4'-methyl-benzenesulfonyl)-1,1-tetramethylene-semicarbazide was 2.6 grams (90% of theory). Melting point 180–182° C.

From 0.9 gram of sodium benzenesulfonamide and 1.0 gram of 1,1,5,5-tetramethylene-carbohydrazide there was obtained in an analogous manner in the course of 5 minutes at 180° C. 4-benzenesulfonyl-1,1-tetramethylene-semicarbazide with a yield of 80%. Melting point 172° C. after recrystallization from methanol.

From 0.9 gram of sodium 4- chloro-benzenesulfonamide and 0.9 gram of 1,1,5,5-tetramethylene-carbohydrazide there was obtained 4-(4'-chloro-benzenesulfonyl)-1,1-tetramethylene-semicarbazide in a yield of 90% when stirring mixture of the components for 5 minutes at 180° C. Melting point 198° C. (after recrystallization from methanol).

*Example 4.—4-(4'-benzoyl-benzenesulfonyl)-1,1-pentamethylene-semicarbazide*

1.4 grams of sodium benzophenone-4-sulfonamide were mixed in an Erlenmeyer flask with 1.13 grams of 1,1,5,5-bis-pentamethylene-carbohydrazide and stirred for 5 minutes at 180° C. The cool sodium salt was dissolved in water, acidified with acetic acid, and the separated precipitate was recrystallized from methanol. Yield 1.5 grams (82% of theory). Melting point 192° C.

*Example 5.—4-(4'-acetyl-benzenesulfonyl)-1,1-pentamethylene-semicarbazide*

By reacting sodium acetophenone-4-sulfonamide with 1,1,5,5-bis-pentamethylene-carbohydrazide according to Example 4 there was obtained 4-(4'-acetyl-benzenesulfonyl)-1,1-pentamethylene-semicarbazide in a yield of 81% of theory. The product melts at 196–198° C. after recrystallization from methanol.

*Example 6.—4-(4'-trifluoromethyl-benzenesulfonyl)-1,1-pentamethylene-semicarbazide*

1.25 grams of sodium 4-trifluoromethyl-benzenesulfonamide were mixed with 1.3 grams of 1,1,5,5-bis-pentamethylene-carbohydrazide and heated for 5 minutes at 100° C. in an Erlenmeyer flask. The solidified sodium salt was dissolved in water, precipitated with 2N-acetic acid, filtered off after cooling at 5° C. and recrystallized from methanol. The substance obtained melted at 213° C. Yield 1.48 grams (85% of theory).

*Example 7.—4-(3-trifluoromethyl-benzenesulfonyl)-1,1-pentamethylene-semicarbazide*

1.25 grams of sodium 3-trifluoromethyl-benzenesulfonamide were thoroughly mixed with 1.13 grams of 1,1,5,5-bis-pentamethylene-carbohydrazide and heated for 7 minutes at 180° C. The sodium salt thus obtained was dissolved in water and acidified with acetic acid. The substance obtained melted at 172° C. after recrystallization from methanol. Yield 1.270 grams (73% of theory).

We claim:

A process for the manufacture of (1) benzenesulfonyl-semicarbazides of the formula

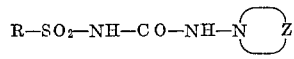

in which R is a member selected from the group consisting of

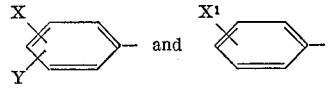

wherein X and Y each are members selected from the group consisting of hydrogen, halogen, alkyl and alkoxy having at most 6 carbon atoms, $X^1$ is a member selected from the group consisting of trifluoromethyl, azido, acetyl and benzoyl and Z is a member selected from the group consisting of alkylene having from 3 to 7 carbon atoms and alkylene having from 3 to 7 carbon atoms substituted by alkyl groups which have at most 4 carbon atoms, which comprises heating substantially equimolar quantities of a benzenesulfonamide of the formula

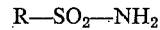

wherein R has the meaning given above, with a 1,1,5,5-alkylene-carbohydrazide of the formula

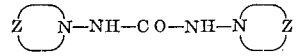

wherein Z has the meaning given above, a temperature between 100° C. and 200° C.

References Cited by the Examiner

UNITED STATES PATENTS 3,005,022   10/1961   McLamore et al. _____ 260—553

FOREIGN PATENTS 560,631   9/1957   Belgium.

IRVING MARCUS, *Primary Examiner.*

NICHOLAS S. RIZZO, WALTER A. MODANCE,
*Examiners.*